Aug. 25, 1959
J. ZOLDAK
2,901,271
LONGITUDINALLY-DIVIDED PIPE COUPLING
SLEEVE WITH FLUID PRESSURE SEAL
Filed Aug. 29, 1957
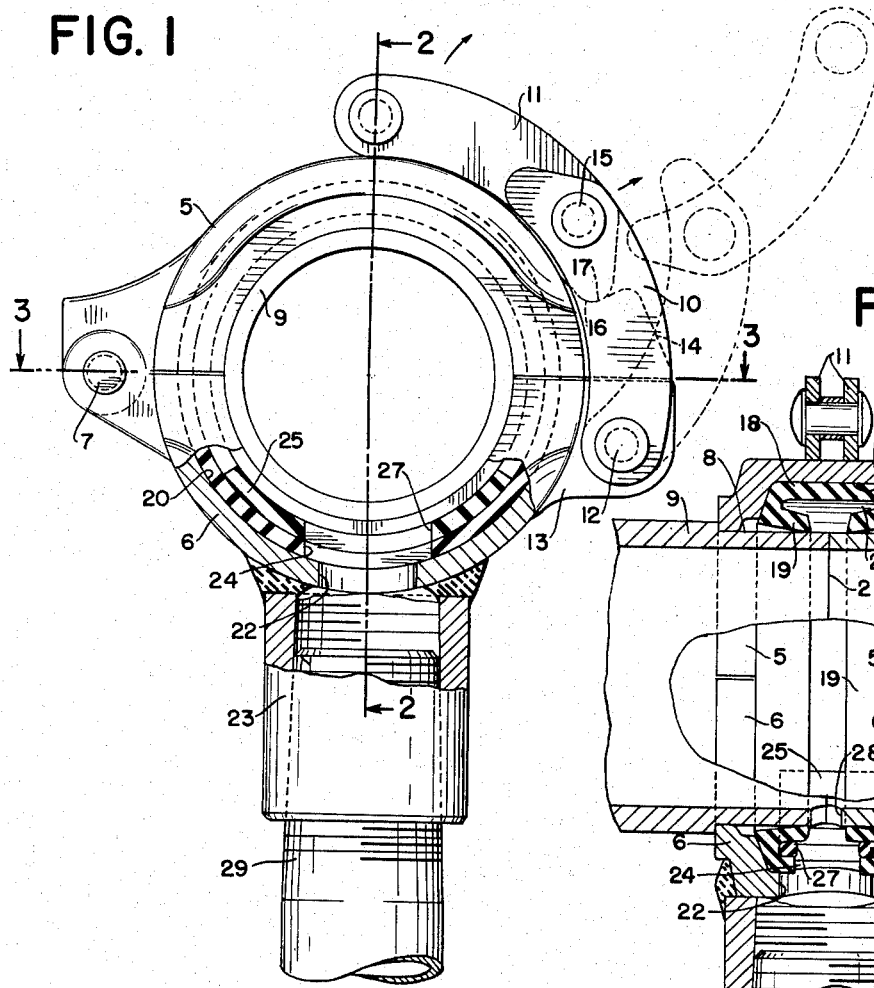
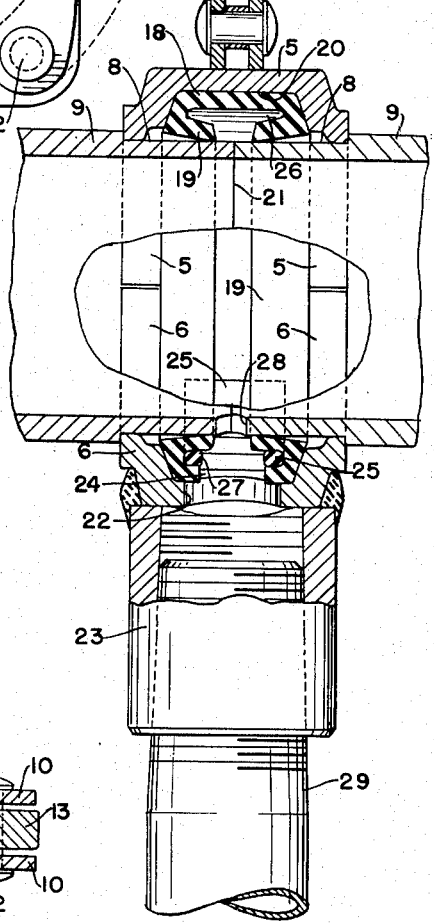
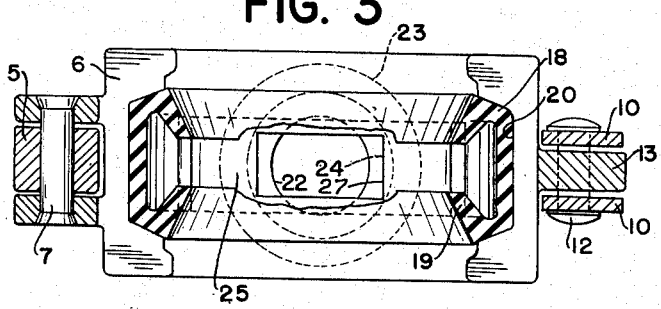
INVENTOR.
JOHN ZOLDAK
BY
Pennie, Edmonds, Morton, Barrows, Taylor
ATTORNEYS

2,901,271
LONGITUDINALLY-DIVIDED PIPE COUPLING SLEEVE WITH FLUID PRESSURE SEAL

John Zoldak, Butte, Mont., assignor to The Anaconda Company, New York, N.Y., a corporation of Montana Application August 29, 1957, Serial No. 681,052

1 Claim. (Cl. 285—108)

This invention relates to a coupling for an end-grooved pipe line, and has for its object the provision of an improved pipe coupling for providing a simple, quickly-installed outlet or branch service line at any point in an end-grooved pipe line.

The invention will be best understood from the following description taken in conjunction with the accompanying drawing, in which Fig. 1 is a transverse elevation of an end-grooved pipe line coupling provided with the branch outlet adapter of the invention, partly in section, Fig. 2 is a longitudinal sectional elevation on the section line 2—2 of Fig. 1, with a portion of the pipe line joint cut away, and Fig. 3 is a sectional plan on the section line 3—3 of Fig. 1 with parts broken away.

In the drawing, the invention is shown embodied in an end-grooved pipe coupling which has heretofore, in its unmodified form, been commonly used for connecting together a pair of communicating pipe sections having circumferential grooves near their ends instead of threads. The coupling (sometimes referred to as a victaulic type pipe line coupling) comprises a pair of mated semi-cylindrical housing members 5 and 6, of metal or other suitable material, hinged together at one end (7) and adapted to be swung apart for encompassing the joint and grooved ends 8 of communicating pipe sections 9, and to be clamped or locked together in their pipe-joint encompassing positions.

An arcuate two-piece clamp arm 10—11 is pivotally mounted (12) on an integral lug 13 of the member 6 positioned approximately opposite the hinge point 7. The other member 5 has an integral lug 14 opposite and complementary to the lug 13. The clamp arm consists of two arcuate twin links 10 and 11, one of which 10 is pivoted (12) at one end thereof to the lug 13. The other twin link 11 is pivoted (15) near one end thereof to the other end of the link 10. The link 11 has near the pivot point 15 a rounded locking end 16 which is adapted to wedgingly engage a mating locking recess 17 in the adjacent stationary lug 14 when the clamp arm is swung from its dotted line position in Fig. 1 to its locking position shown in full lines in Fig. 1.

A flexible ring gasket, of rubber or the like, encircles the grooved ends of the communicating pipe sections 9 and provides a tight seal thereat. The gasket is of the internal pressure type comprising an outer flexible body portion 18 and a pair of spaced flexible annular flanges 19 extending inwardly from the body portion and adapted to be pressed into sealing engagement with the grooved ends of the pipe sections. The body portion 18 of the gasket snugly fits complementary semi-annular channels 20 on the inside of the housing members 5 and 6. When the members 5 and 6 are closed in mating position encompassing the gasket and pipe joint 21 with the body portion 18 of the gasket fitted snugly in the channels 20, the two-piece clamp arm 10—11 is swung (counter-clockwise as viewed in Fig. 1) about its pivot 12 until the rounded ends of the twin link 10 slide into locking engagement with the stationary recess 17 of the lug 14, and thereby the members 5 and 6 are securely held in closed mating position by the clamp arm 10—11 which encircles about one-fourth of the external circumference of the mating members 5 and 6. This type of pipe coupling is commonly used in the art. The present invention resides in so modifying the coupling as to adapt it to serve as a simple and rapid means of taking off from a main pipe line an additional service line for water, air, gas or other fluid.

In accordance with the invention, a hole 22 is drilled, punched, burned, or otherwise appropriately made, through the peripheral wall of either member 5 or 6 at approximately the middle of the arc. As shown in the drawing, the hole 22 has been made in the member 6. An internally threaded pipe sleeve 23 extends radially from the housing member 6 with its longitudinal axis registering or aligned with the center of the hole 22. Any size pipe coupling may be modified in accordance with the invention, and the adapter or take-off pipe sleeve may be of any size compatible with that of the coupling and pipe line. The pipe sleeve 23 is preferably welded to the member 6, but may be permanently secured thereto in any other appropriate manner.

Prior to installing the pipe coupling, the gasket 18—19 is placed in position encircling the end grooves 8 and the pipe joint 21. The pipe coupling is swung open to permit the housing members 5 and 6 to be positioned around the gasket, the members are closed to encompass the gasket, and are locked by the linkage 10—11 in their gasket-encompassing positions. Preferably, the hole 22 is made in the peripheral wall of the member 6 before the coupling is operatively positioned around the gasket and pipe joint, but it need not be made until it is desired to utilize the pipe sleeve 23 for taking off a branch service line. Where the pipe line is provided with outlet adapter couplings of the invention at each pipe section joint, an additional service line can be quickly taken off at any joint.

When a branch service line is to be taken off, a round or rectangular hole 24 is cut, or otherwise appropriately made, through the body portion 18 of the gasket in alignment with the hole 22. To complete the seal, a relatively long flat gasket 25, of rubber or the like, is inserted in the annular space 26, between the body 18 and flanges 19 of the gasket, and is itself provided with a hole 27 of about the same size and shape as the hole 24 and aligned therewith. The gasket 25 extends circumferentially for about the circumferential length of the hole 27 beyond each side thereof. The gasket 25 acts to mechanically reinforce the flexible ring gasket where it has been weakened by the formation of the rectangular hole 24 and assures that the flexible ring gasket is held tightly, in the vicinity of the hole 24, against both the ends of the pipe 9 and the surrounding clamping member. A hole 28 is next drilled, or otherwise appropriately made, through the grooved ends 8 of the pipe sections 9 at the joint 21 of about the same size and shape as the holes 24 and 27 and aligned therewith. It will be apparent that with the improved pipe coupling of the invention, the aligning holes 24 and 28 can be conveniently made through the pipe sleeve 23 since they are immediately adjacent and directly communicate with one another and with the pipe sleeve. The flat gasket 25 may be inserted in the annular space 26 when the ring gasket 18—19 is initially installed, and the hole 27 (if not already provided) may be made therein at the time the hole 24 is made in the ring gasket. Alternatively, the flat gasket 25 (with or without the hole 27) may be inserted at the time it is desired to take off the branch service line by temporarily unclamping the pipe coupling and swinging the housing member 6 away from the ring gasket.

As previously stated the invention may be embodied in any size pipe coupling. Merely by way of example, with a pipe line (9) of 2 inches internal diameter, the adapter 23 may advantageously be a 1 inch pipe sleeve, the hole 22 may be round and about ¾ inch in diameter; the holes 24, 27 and 28 may be rectangular and about ½ inch (longitudinally) by 1 inch (circumferentially) and the circumferential length of the gasket 25 may be about 3 inches, its longitudinal width about ¾ inch and its thickness about ⅛ inch.

There will generally be a surge of fluid from the pipe line when the hole 28 is made therein, but this is a matter of little concern where preparations have been made to promptly thread the branch pipe line 29 into the pipe sleeve 23 as soon as the hole through the wall of the main pipe line has been completed. In this manner, the improved pipe coupling of the invention provides a simple and quickly installed outlet at any joint in the pipe line system for taking off an additional branch service line for water, air, gas or such other fluid as the main pipe line may be supplying.

The longitudinal width of the hole 28 in the pipe line is restricted to about the width of the space between the flanges 19 of the ring gasket 18—19. When the flow of liquid or gas to the branch pipe line 29 is insufficient, the volume delivered to that line can be increased by pushing and bracing against the side of the main pipe line, opposite the branch outlet, thus causing a larger spread between the ends of the two communicating pipe sections in the area of the branch outlet.

While the coupling of the invention has been shown and described as applied about the main conduit at a place where two pipe sections abut one another, it is to be understood that it may be used along a main conduit at any place where it is desired to connect a takeoff branch line.

I claim:

A coupling for connecting a branch take-off pipe to a main conduit comprising a pair of mated, semi-cylindrical clamping members hinged together at one end and clampable together at their other end, said clamping members being adapted to be clamped about a main conduit at a place where a take-off branch pipe is to be connected thereto, a pipe sleeve adapter permanently secured to and extending radially from one of said semi-cylindrical clamping members intermediate its ends to which a branch pipe is adapted to be connected, said clamping members having a circumferential groove in their inner faces, a flexible ring gasket generally C-shaped in cross-section throughout in said groove, said gasket comprising a base portion lying against the bottom of said groove and a pair of flanges extending inwardly towards one another from the sides of said base portion and spaced from said base portion, and a reinforcing gasket in the space between said base portion and said flanges and bridging the space between the inner sides of said flanges, said reinforcing gasket extending for only a minor portion of the circumference of said ring gasket, the combined thicknesses of said base portion, one of said flanges and said reinforcing gasket being no less in magnitude than the depth of said groove, said base portion of said ring gasket and said reinforcing gasket being adapted to have openings formed in them opposite a take-off opening in the main conduit to which the coupling is attached, said reinforcing gasket, at such time, being adapted to hold the flanges of the ring gasket against the main conduit and to hold the base portion of the ring gasket against the coupling member in the vicinity of such opening in the main conduit.

References Cited in the file of this patent

UNITED STATES PATENTS

| | | |
|---|---|---|
| 645,823 | Martin | Mar. 20, 1900 |
| 2,132,769 | Wallis | Oct. 11, 1938 |
| 2,449,795 | Stillwagon | Sept. 21, 1948 |
| 2,752,174 | Frost | June 26, 1956 |
| 2,789,847 | Jackson | Apr. 23, 1957 |

FOREIGN PATENTS

| | | |
|---|---|---|
| 270,425 | Great Britain | May 10, 1927 |